(12) United States Patent
Nestares

(10) Patent No.: US 8,139,894 B2
(45) Date of Patent: Mar. 20, 2012

(54) AUTOMATIC DOMINANT ORIENTATION ESTIMATION IN TEXT IMAGES BASED ON STEERABLE FILTERS

(75) Inventor: Oscar Nestares, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1115 days.

(21) Appl. No.: 11/961,648

(22) Filed: Dec. 20, 2007

(65) Prior Publication Data

US 2009/0161991 A1    Jun. 25, 2009

(51) Int. Cl.
*G06K 9/36* (2006.01)
(52) U.S. Cl. ......... 382/290; 382/114; 382/289; 382/296
(58) Field of Classification Search .................. 382/114, 382/289, 290, 296
See application file for complete search history.

(56) References Cited

U.S. PATENT DOCUMENTS

| | | | |
|---|---|---|---|
| 5,546,479 A * | 8/1996 | Kawanaka et al. | 382/290 |
| 5,684,894 A * | 11/1997 | Shustorovich | 382/232 |
| 6,151,423 A | 11/2000 | Melen | |
| 6,285,802 B1 * | 9/2001 | Dennis et al. | 382/280 |
| 7,602,995 B2 * | 10/2009 | Araki et al. | 382/290 |
| 7,805,307 B2 * | 9/2010 | Levin et al. | 382/114 |
| 2003/0086721 A1 | 5/2003 | Guillemin et al. | |
| 2005/0212925 A1 | 9/2005 | Lefebure et al. | |
| 2005/0286743 A1 * | 12/2005 | Kurzweil et al. | 382/114 |

FOREIGN PATENT DOCUMENTS

| | | |
|---|---|---|
| JP | 2006-319416 A | 11/2006 |
| KR | 1019980016572 A | 6/1998 |
| KR | 1019990058744 A | 7/1999 |
| WO | 2009/085484 A2 | 7/2009 |
| WO | 2009/085484 A3 | 11/2009 |

OTHER PUBLICATIONS

H. Greenspan, S. Belongie, R. Goodman and P. Perona, "Rotation Invariant Texture Recognition Using a Steerable Pyramid", IEEE, Proceedings of the 12th IAPR International Conference on Pattern Recognition, vol. II Conference B: Pattern Recognition and Neural Networks, pp. 162-167, 1994.*

Adnan Amin and Sue Wu, "Robust Skew Detection in mixed Text/Graphics Documents", IEEE, Proceedings, Eighth International Conference on Document Analysis and Recognition, vol. 1, pp. 247-251, 2005.*

(Continued)

*Primary Examiner* — Matthew Bella
*Assistant Examiner* — Eric Rush
(74) *Attorney, Agent, or Firm* — Cool Patent, P.C.; Kenneth J. Cool; Joseph P. Curtin

(57) ABSTRACT

Briefly, in accordance with one or more embodiments, an image processing system is capable of receiving an image containing text, applying optical character recognition to the image, and then audibly reproducing the text via text-to-speech synthesis. Prior to optical character recognition, an orientation corrector is capable of detecting an amount of angular rotation of the text in the image with respect to horizontal, and then rotating the image by an appropriate amount to sufficiently align the text with respect to horizontal for optimal optical character recognition. The detection may be performed using steerable filters to provide an energy versus orientation curve of the image data. A maximum of the energy curve may indicate the amount of angular rotation that may be corrected by the orientation corrector.

20 Claims, 4 Drawing Sheets

OTHER PUBLICATIONS

G.S. Peake and T.N. Tan, "A General Algorithm for Document Skew Angle Estimation", IEEE, Proceedings, International Conference on Image Processing, vol. 2, pp. 230-233, 1997.*

Changming Sun and Deyi Si, "Skew and Slant Correction for Document Images Using Gradient Direction", IEEE, Proceedings of the Fourth International Conference on Document Analysis and Recognition, vol. 1, pp. 142-146, 1997.*

International Search Report for PCT/US2008/084548 mailed Jun. 30, 2009. 10 Pages.

'The Design and Use of Steerable Filters', William T. Freeman, et al.; IEEE Transactions on Pattern Analysis and Machine Intelligence, vol. 13, No. 9, Sep. 1991; 16 pgs.

'A Document Skew Detection Method Using Run-Length Encoding and the Hough Transform', Stuart C. Hinds, et al.; The MITRE Corporation/Civil Systems Division, System Engineering and Applied Technology; IEEE 1990; pp. 464-468.

'Automatic enhancement of noisy image sequences through local spatiotemporal spectrum analysis', Oscar Nestares, et al.; SENER Ingenieria y Sistemas, S.A., Aerospace Division, Spain; Jun. 2000; Society of Photo-Optical Instrumentation Engineers; pp. 1457-1469.

'A Robust and Fast Skew Detection Algorithm for Generic Documents', Bin Yu, et al.; Department of Computer Science, Michigan State University; 17 pgs., 1996.

Simoncelli, et al., "The Steerable Pyramid: a flexible architecture for multi-scale derivative computation", 2nd IEEE International Conference on Image Processing, Washington, DC, Oct. 1995, pp. 444-447.

International Preliminary Report on Patentability Received for PCT Application No. PCT/US2008/084548, mailed on Jul. 1, 2011, 6 pages.

European Search Report Received for EP Application No. 08867791.9, mailed on Sep. 8, 2011, 4 pages.

* cited by examiner

AUTOMATIC DOMINANT ORIENTATION ESTIMATION IN TEXT IMAGES BASED ON STEERABLE FILTERS

BACKGROUND

Image-processing systems may be utilized by visually impaired persons to obtain images of text and to process the text images so that the corresponding text can be audibly read aloud to the user by an appropriate text-to-speech engine. In such image-processing systems, optical character recognition engines may be utilized to convert text in an image format into text in a character-based format for further processing by the text-to-speech engine. Often, however, the text may not be optimally aligned with respect to horizontal in the image to be processor, or the image itself may not have been captured in a sufficient alignment with respect to horizontal, thereby causing the text to be rotationally offset from horizontal. Typically, an optical character recognition engine may require the text in the image to be aligned within a certain range, typically +/−10 degrees from horizontal, in order to be able to properly recognize the characters contained in the text.

DESCRIPTION OF THE DRAWING FIGURES

Claimed subject matter is particularly pointed out and distinctly claimed in the concluding portion of the specification. Such subject matter may, however, be understood by reference to the following detailed description when read with the accompanying drawings in which:

Figure 1:
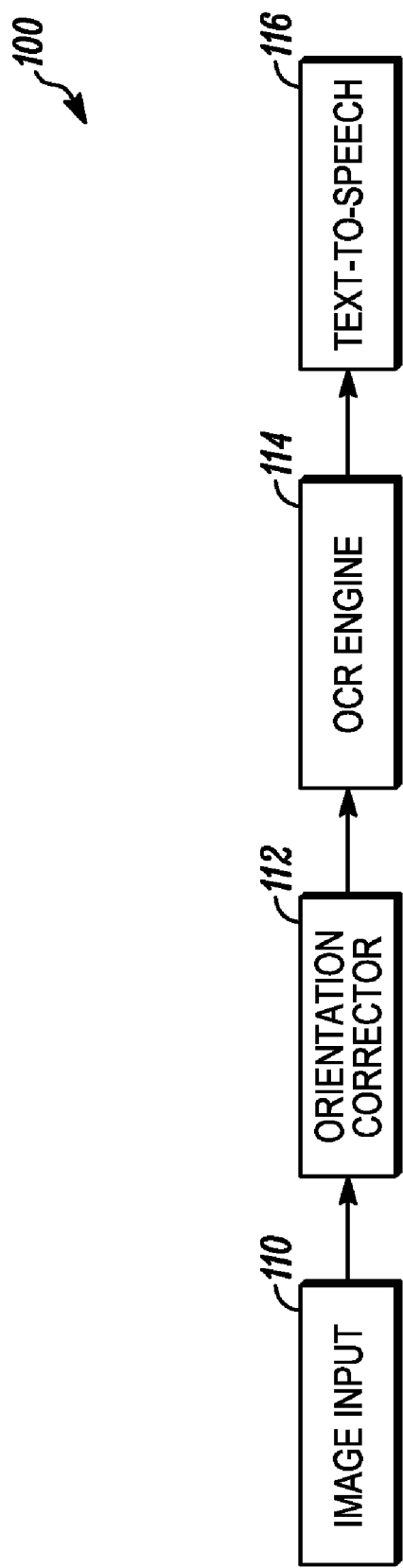
FIG. 1 is a block diagram of an image processing system in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. Coupled may, however, also mean that two or more elements may not be in direct contact with each other, but yet may still cooperate and/or interact with each other. For example, "coupled" may mean that two or more elements do not contact each other, but are indirectly joined together via another element or intermediate elements. Finally, the terms "on," "overlying," and "over" may be used in the following description and claims. "On," "overlying," and "over" may be used to indicate that two or more elements are in direct physical contact with each other. "Over" may, however, also mean that two or more elements are not in direct contact with each other. For example, "over" may mean that one element is above another element but not contact each other and may have another element or elements in between the two elements. Furthermore, the term "and/or" may mean "and," it may mean "or," it may mean "exclusive-or," it may mean "one" it may mean "some, but not all,", it may mean "neither," and/or it may mean "both," although the scope of claimed subject matter is not limited in this respect. In the following description and/or claims, the terms "comprise" and "include," along with their derivatives, may be used and are intended as synonyms for each other.

Referring now to FIG. 1, a block diagram of an image-processing system in accordance with one or more embodiments will be discussed. In one or more embodiments, image-processing system 100 may be utilized to capture or receive an image that may include one or more passages or regions of text or writing, convert the text image data into text data, and then convert the text into an audible speech format, for example, so that a user of image-processing system 100 may be able to audile hear the words, phrases, and/or sentences in the image. For example, image-processing system 100 may be utilized to assist a user having visual impairment and thus difficulty in seeing and/or reading. Image-processing system 100 may be utilized by such a visually impaired user to read aloud words, phrases, sentences or other text captured or received in an image format, so that the user may hear the words, phrases, sentences, and/or other text as speech. Such speech may be electronically synthesized, for example, in one or more embodiments. As shown in FIG. 1, image-processing system 100 may receive an image input 110 that may be provided to orientation corrector 112 for detecting and orienting an image received by image input 110. In one or more embodiments, image input 110 may comprise circuitry capable of capturing an image and converting the image into a digital format. For example, image input 110 may comprise a camera-based on a charge-coupled device (CCD) array, a complementary metal-oxide semiconductor (CMOS) array, or the like type of imaging device. Alternatively, image input 110 may comprise a front end capable of receiving an image in a digital format from another device that captured the image, and/or optionally converting the image data into an image format suitable for processing by image-processing system 100. For example, in such embodiments, image input 110 may comprise a card or disk reader capable of reading image data from a memory card or disk, a video input system capable of capturing and/or receiving an input signal from another device providing a digital output signal, and so on. These are, however, merely example embodiments for image input 110, and the scope of the claimed subject matter is not limited in these respects.

Orientation corrector 112 received image data from image input 110 corresponding to an image and/or a video stream. Orientation corrector 112 is utilized to preprocess the image data prior to processing by optical character reader (OCR)

engine 114. Typically, OCR engine 114 may perform optimally if the text is presented to optical character engine 114 in a horizontal format, or oriented as nearly horizontal as possible. Images captured and/or received by image-processing system 100 may, however, not always be received in a horizontal alignment, for example, if a camera used to capture the text image is not well aligned with the camera. Likewise, text sometimes may be intentionally written non-horizontally, for example, the text may be written vertically from bottom to top, such as might appear on a poster or sign. In one or more embodiments, OCR engine 114 may be capable of detecting the orientation of the text with respect to a horizontal line, and then correct the image of the text by rotating the text by an appropriate angle so that the text falls within a horizontal alignment, and/or a sufficiently horizontal alignment, to provide a more optimal image for processing by OCR engine 114. The output of OCR engine 114 may then be provided to a text-to-speech synthesizer 116 for converting the text processed by OCR engine 114 into audible speech that may be heard by the user of image-processing engine. It should be noted that any one or more of image input 110, orientation corrector 112, OCR engine 114, and/or text-to-speech block 116 may be implemented in whole or in part in hardware and tangibly embodied by an appropriate circuit, and/or implemented in whole or in part and tangibly embodied by an appropriate software module or program, and the scope of the claimed subject matter is not limited in this respect. Further details of the operation of orientation corrector are shown in and described with respect to FIG. 2, below.

Figure 2:
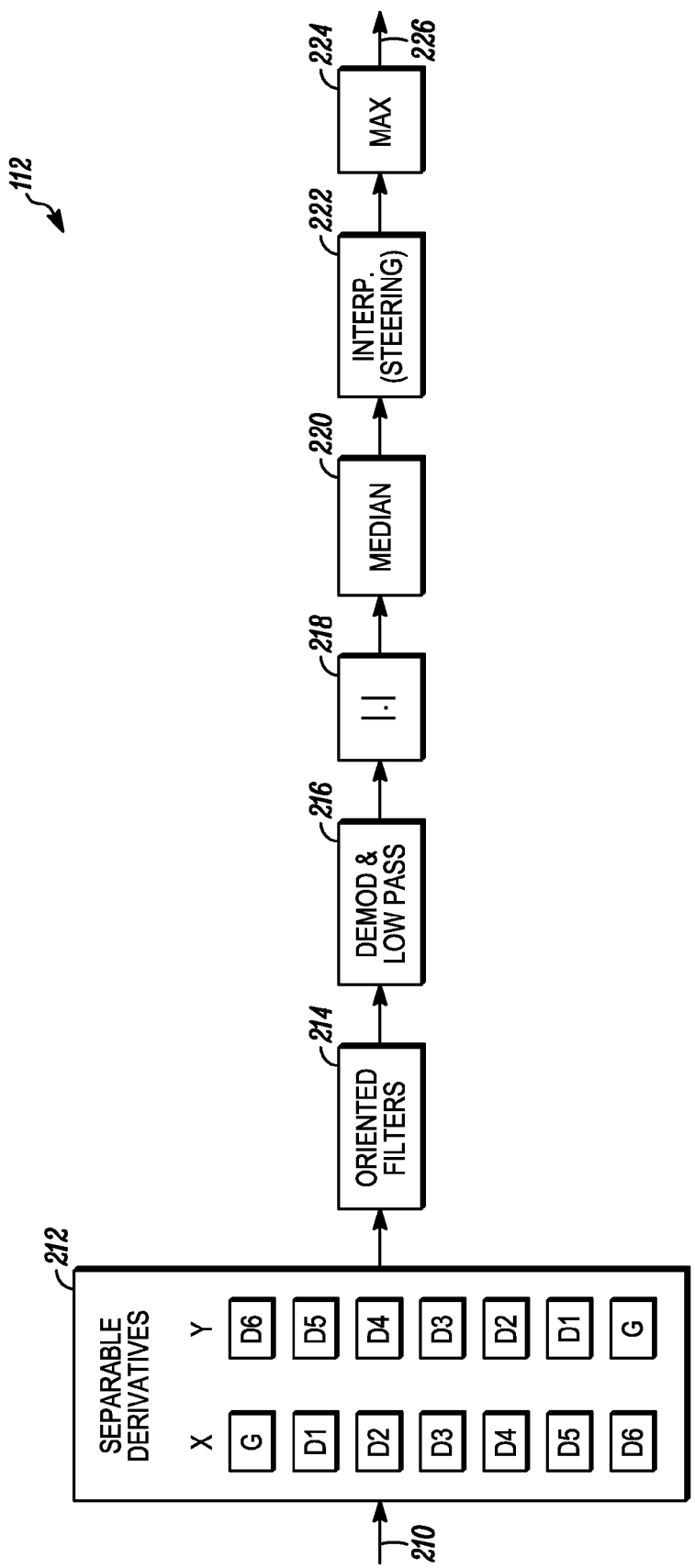
FIG. 2 is a block diagram of an orientation corrector capable of detecting and correcting an orientation of an image received by an image-processing system in accordance with one or more embodiments.

Referring now to FIG. 2, a block diagram of an orientation corrector capable of detecting and correcting an orientation of an image received by an image-processing system in accordance with one or more embodiments will be discussed. As shown in FIG. 2, the blocks of orientation corrector may be implemented to the image data 210 received from image input 110 of FIG. 1. In one or more embodiments, the operations performed by the blocks of orientation corrector may be applied to a multi-resolution pyramid of the input image data 210, in which each level may be obtained by first low-pass filtering the image data 210 from a previous level with a separable cubic b-spline filter, and then subsampling a factor of 2 in both dimensions. The input image from each level, using intensity values, is first filtered at separable derivatives block 212 with a bank of separable derivative filters, which may comprise Gaussian derivative filters for example. In the particular embodiment of separable derivatives block 212 shown in FIG. 2, $6^{th}$-order derivatives may be utilized to provide a suitable compromise between angular resolution and computation, since higher orders may provide better resolution, but at a higher cost. The bank of filters implemented by separable derivatives block 212 may comprise first passing the set of derivatives in the horizontal (X) dimension from the Gaussian kernel to the sixth-order derivative of this kernel. Subsequently, the set of derivatives may be applied to the vertical (Y) dimension in reverse order so that the resulting images comprise the set of two-dimensional (2D) sixth-order partial derivatives of the input image data 210. To obtain the set of seven directional derivatives it may be sufficient to apply a set of seven appropriate linear combinations via oriented filters block 214 over the output of the previous stage of separable derivates block 212. From the set of directional derivatives provided by oriented filters block 214, demodulation and low-pass filter block 216 may be utilized to obtain energy measurements by first demodulating the filter response by the tuning frequency of the filter, and then low-pass filtering to eliminate the replicas of the spectrum. The magnitude of the complex output of demodulation and low-pass filter block 218 may then be computed. In the case of global orientation estimation, the local energy measurements may be collapsed into a single global number for each oriented filter in each resolution level. This may be accomplished by computing the median across all the pixels in each energy image via median block 220, and then taking the average of the resulting values across different resolutions for the same orientation (not shown in FIG. 2). The output of the median block 220 produces a set of energy samples, which comprise seven energy samples in the present example, which are plotted as data points (stars) in the graph 300 of FIG. 3 which represents energy versus orientation. From these data points an interpolated curve of the energy versus orientation may be obtained by interpolation (steering) block 222, interpolating appropriately the responses from the seven samples to arrive at a continuous curve. In one or more embodiments, theoretical interpolation formulas for steerable filters may be utilized, although other interpolation methods may likewise be utilized, and the scope of the claimed subject matter is not limited in this respect. Finally, from the interpolation curve the orientation that produces a maximum energy response may be selected via max block 224 to determine the orientation of the text in the image data 210. In one or more embodiments, the text in image 210 is disposed at an orientation angle corresponding to the angle at maximum energy from the interpolation curve, plus 90 degrees clockwise, which may be indicated by orientation output 226. Orientation corrector 112 may then rotate the image data 210 by an amount of angular rotation indicated by orientation output so that the text may be aligned, or nearly aligned, with respect to horizontal using an appropriate interpolation technique. In one or more embodiments, such an interpolation technique may comprise a bilinear interpolation; however, the scope of the claimed subject matter is not limited in this respect.

Figure 3:
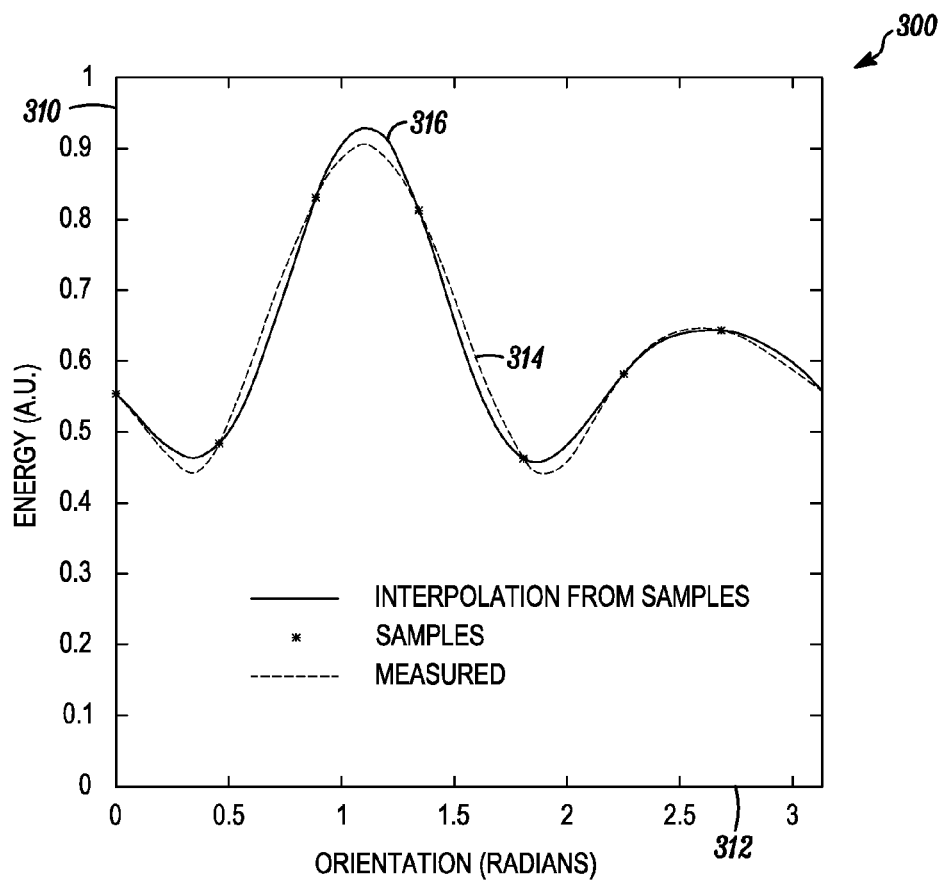
FIG. 3 is a plot of energy versus orientation utilized to determine an orientation of an image in an orientation corrector in accordance with one or more embodiments.

Referring now to FIG. 3, a plot of energy versus orientation utilized to determine an orientation of an image in an orientation corrector in accordance with one or more embodiments will be discussed. Plot 300 provides energy in arbitrary units (a.u.) on a vertical axis 310 versus orientation of the directional derivative filter in radians on a horizontal axis 312. As discussed with respect to FIG. 2, above, interpolation (steering) block 222 may provide approximate measured values for energy versus orientation of the corresponding directional derivative filter applied to image data 210, indicated as plot 314. From the set of seven measured sample values, a continuous interpolation curve 316 of energy versus orientation may be obtained by applying appropriate steerable filter interpolation function to the samples. The interpolation curve may then be applied to max block 222 to obtain orientation an orientation output 226 that is representative of the orientation of the image contained in image data 210. The orientation output 226 allows orientation corrector to rotationally align the image with a horizontal line, for example, as shown in and described with respect to FIG. 4, below.

Figure 4:
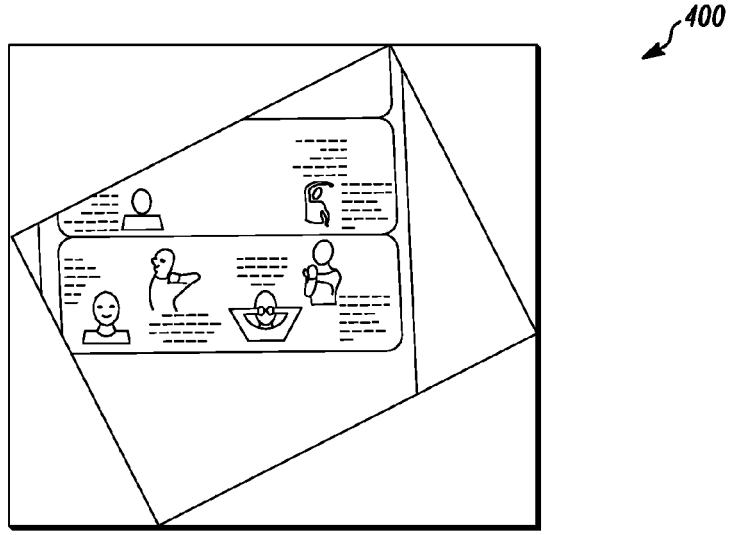
FIG. 4 is an example image that has been rotated by an orientation corrector of an image-processing system in accordance with one or more embodiments.

Referring now to FIG. 4, an example image that has been rotated by an orientation corrector of an image processing system in accordance with one or more embodiments will be discussed. FIG. 4 represents an example image 400 that has been rotated by orientation corrector 112 to be aligned, or nearly aligned, with the horizontal in order to optimize the performance of OCR engine 114 to recognize the characters of text contained within image 400. The orientation detection and correction function provided by orientation corrector 112 may provide image preprocessing for image-processing system 100, for example to perform an automatic OCR of pictures taken under non-controlled conditions, such as by low-vision or blind persons. As described herein, orientation corrector 112 may be capable automatically correcting for in-plane rotation to an amount suitable for OCR engine 114, for example, aligned to horizontal within +/−10 degrees. Furthermore, orientation corrector 112 is capable of applying such an orientation detection and correction function to a local portion of an image, so that each local portion may be individually rotated by an amount suitable for OCR processing. The ability of orientation corrector 112 to perform local orientation correction for portions of an image may be obtained via the utilization of steerable filters via oriented filters block 214 since the filter responses are local, meaning that at each pixel there is a set of samples of the local Fourier energy. Therefore, it is possible for orientation corrector 112 to perform a local analysis instead of a global one, thereby allowing for the automatic detection of different regions containing text rotated to different orientations with respect to one another. In one embodiment, the detection of different local orientations may be performed by orientation corrector 112 by first performing clustering of the pixels, using for example k-means to cluster the vectors formed with the energy samples, and then estimating the orientation within each cluster. As a result, if the input image data 210 contains regions of text rotated at different orientations such local analysis can be applied to one or more of the local regions, although the scope of the claimed subject matter is not limited in this respect.

In one or more embodiments, a particular OCR engine 114 may be selected for image processing system 100 independent of the preprocessing capabilities of a given OCR engine 114 in terms of orientation estimation and correction, so that the selection may be made at least in part predominantly on the OCR performance of OCR engine 114 itself rather than being based on preprocessing capabilities, although the scope of the claimed subject matter is not limited in this respect.

Figure 5:
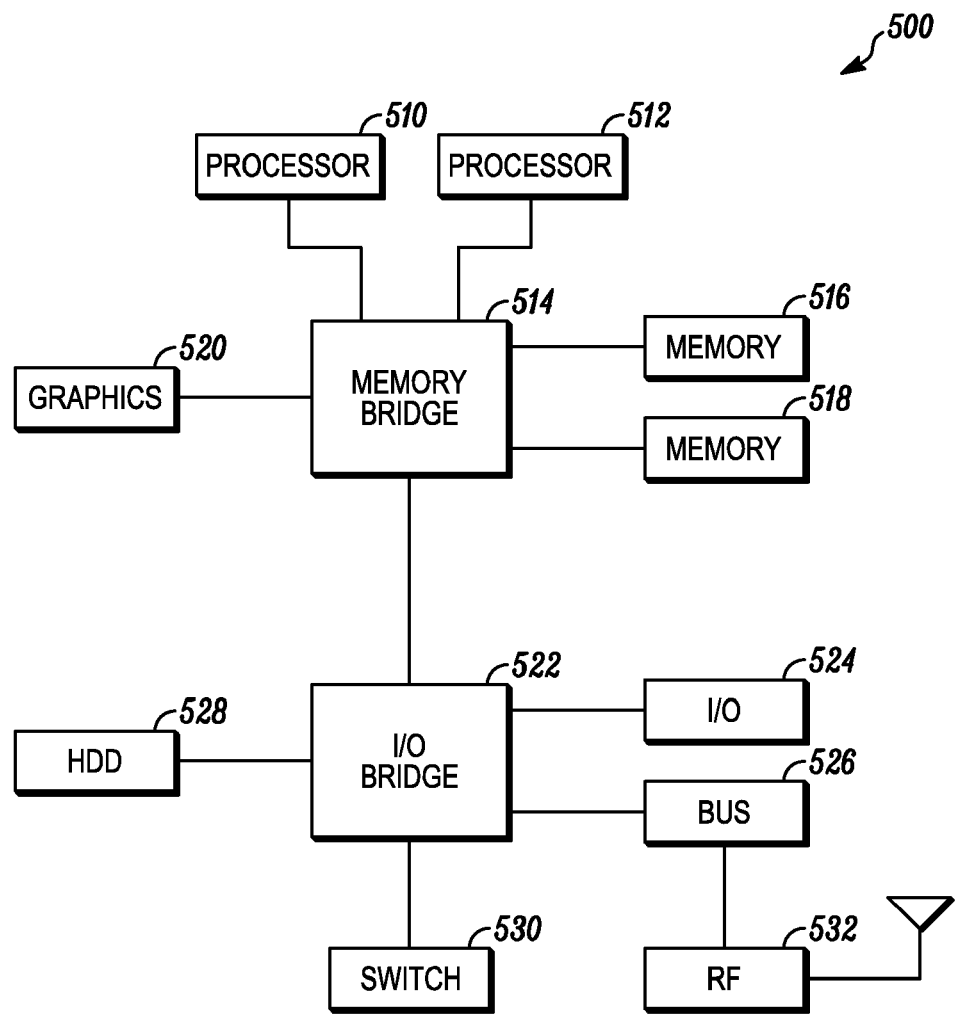
FIG. 5 is a block diagram of an information handling system capable of tangibly embodying an imaging system having an orientation corrector in accordance with one or more embodiments.

Referring now to FIG. 5, a block diagram of an information-handling system capable of tangibly embodying an imaging system having an orientation corrector in accordance with one or more embodiments will be discussed. Information-handling system 500 of FIG. 5 may tangibly embody one or more of any of the components of image-processing system 100 as shown in and described with respect to FIG. 1. For example, Information-handling system 500 may represent the hardware of orientation corrector 112, with greater or fewer components depending on the hardware specifications of the particular device or application. Although information-handling system 500 represents one example of several types of computing platforms, information-handling system 500 may include more or fewer elements and/or different arrangements of elements than shown in FIG. 5, and the scope of the claimed subject matter is not limited in these respects.

Information-handling system 500 may comprise one or more processors, such as processor 510 and/or processor 512, which may comprise one or more processing cores. One or more of processor 510 and/or processor 512 may couple to one or more memories 516 and/or 518 via memory bridge 514, which may be disposed external to processors 510 and/or 512, or alternatively at least partially disposed within one or more of processors 510 and/or 512. Memory 516 and/or memory 518 may comprise various types of semiconductor-based memory, for example, volatile-type memory and/or non-volatile-type memory. Memory bridge 514 may couple to a graphics system 520 to drive a display device (not shown) coupled to information-handling system 500.

Information-handling system 500 may further comprise input/output (I/O) bridge 522 to couple to various types of I/O systems. I/O system 524 may comprise, for example, a universal serial bus (USB) type system, an IEEE-1394-type system, or the like, to couple one or more peripheral devices to information-handling system 500. Bus system 526 may comprise one or more bus systems, such as a peripheral component interconnect (PCI) express type bus or the like, to connect one or more peripheral devices to information handling system 500. A hard disk drive (HDD) controller system 528 may couple one or more hard disk drives or the like to information-handling system 500, for example Serial ATA-type drives or the like, or alternatively a semiconductor-based drive comprising flash memory, phase change, and/or chalcogenide type memory or the like. Switch 530 may be utilized to couple one or more switched devices to I/O bridge 522, for example, Gigabit Ethernet-type devices or the like. Furthermore, as shown in FIG. 5, information-handling system 500 may include a radio-frequency (RF) block 532 comprising RF circuits and devices for wireless communication with other wireless communication devices and/or via wireless networks, although the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to automatic dominant orientation estimation in text images based on steerable filters and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
    obtaining image data of an image containing text, the text being disposed at an arbitrary angle of rotation with respect to horizontal;
    detecting the angle of rotation of the text with respect to horizontal by using oriented filters tuned to two or more different orientations, said detecting comprising:
        processing the image data with a bank of separable derivative filters,
        filtering the processed image data with the oriented filters,
        demodulating the filtered image data to obtain energy samples of the filtered and processed image data, and
        interpolating the energy samples from which an orientation of the text may be determined based at least in part on a maximum energy value of the interpolating;
    rotating the image data by an amount based at least in part on said detecting to provide a rotated image to align the text to horizontal; and
    performing optical character recognition on the text on the rotated image.

2. A method as claimed in claim 1, said detecting being performed by using about seven oriented filters tuned to different orientations.

3. A method as claimed in claim 2, further comprising performing the detecting, the rotating, and the performing optical character recognition on two or more local regions in the image independently of one or more other regions.

4. A method as claimed in claim 3, further comprising applying a text-to-speech synthesis on an output of the optical character recognition to audibly reproduce the text.

5. A method as claimed in claim 4, wherein said rotating comprises aligning the text to within ±10 degrees with respect to horizontal.

6. A method as claimed in claim 5, wherein the rotating comprises applying a bilinear interpolation to the image data.

7. A method as claimed in claim 1, further comprising performing said detecting, said rotating, and said performing optical character recognition on two or more local regions in the image independently of one or more other regions.

8. A method as claimed in claim 1, further comprising:
applying a text-to-speech synthesis on an output of the optical character recognition to audibly reproduce the text.

9. A method as claimed in claim 1, wherein said rotating comprises:
aligning the text to within ±10 degrees with respect to horizontal.

10. A method as claimed in claim 1, said interpolating comprising applying an interpolation method for steerable filters to the energy samples.

11. A method as claimed in claim 1, said rotating comprising applying a bilinear interpolation to the image data.

12. An apparatus, comprising:
an image data block capable of obtaining image data of an image containing text, the text being disposed at an arbitrary angle of rotation with respect to horizontal;
an orientation corrector capable of detecting the angle of rotation of the text with respect to horizontal by using oriented filters tuned to two or more different orientations, and being capable of rotating the image data by an amount based at least in part on said detecting to provide a rotated image to align the text to horizontal, the orientation corrector comprising:
a bank of separable derivative filters capable of filtering the image data to provide an input to the oriented filters;
a demodulator capable of demodulating the oriented filtered image data and a magnitude calculator capable of obtaining energy samples of the image data from the demodulator; and
an interpolator capable of interpolating the energy samples from which an orientation of the text may be determined based at least in part on a maximum energy value of the interpolation; and
optical character recognition engine capable of performing optical character recognition on the text on the rotated image.

13. An apparatus as claimed in claim 12, said orientation corrector comprising about seven oriented filters tuned to different orientations.

14. An apparatus as claimed in claim 13, wherein the orientation corrector is capable of performing the detecting and rotating on two or more local regions in the image independently of one or more other regions.

15. An apparatus as claimed in claim 14, further comprising a text-to-speech synthesizer capable of converting an output of the optical character recognition into an audible reproduction of the text.

16. An apparatus as claimed in claim 15, wherein the orientation corrector is capable of aligning the text to within ±10 degrees with respect to horizontal.

17. An apparatus as claimed in claim 12, said orientation corrector being capable of performing the detecting and rotating on two or more local regions in the image independently of one or more other regions.

18. An apparatus as claimed in claim 12, further comprising:
a text-to-speech synthesizer capable of converting an output of the optical character recognition into an audible reproduction of the text.

19. An apparatus as claimed in claim 12, said orientation corrector being capable of aligning the text to within ±10 degrees with respect to horizontal.

20. An apparatus as claimed in claim 12, the interpolator being capable of applying an interpolation method for steerable filters to the energy samples.

* * * * *